United States Patent Office 3,548,683
Patented Dec. 22, 1970

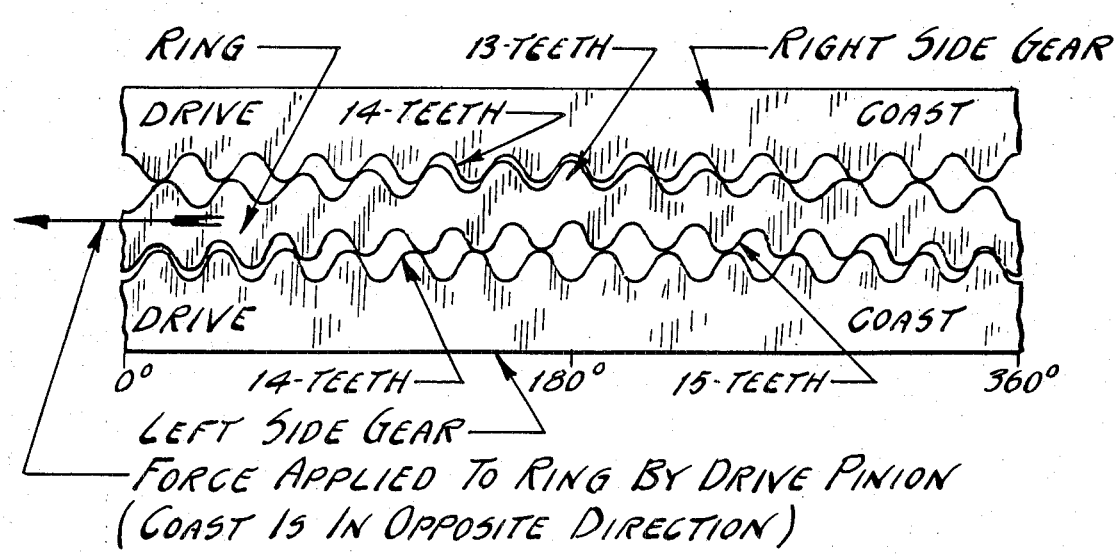
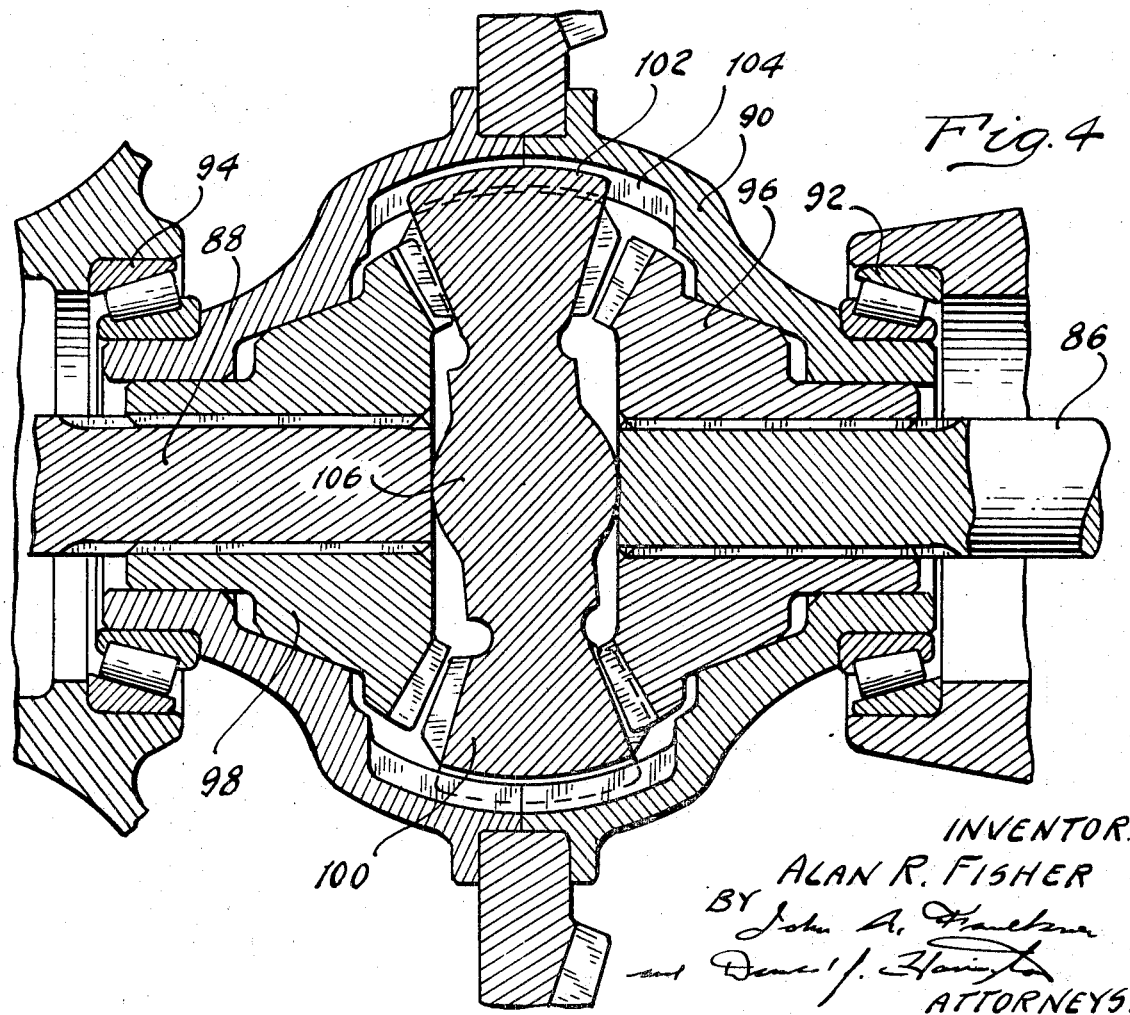

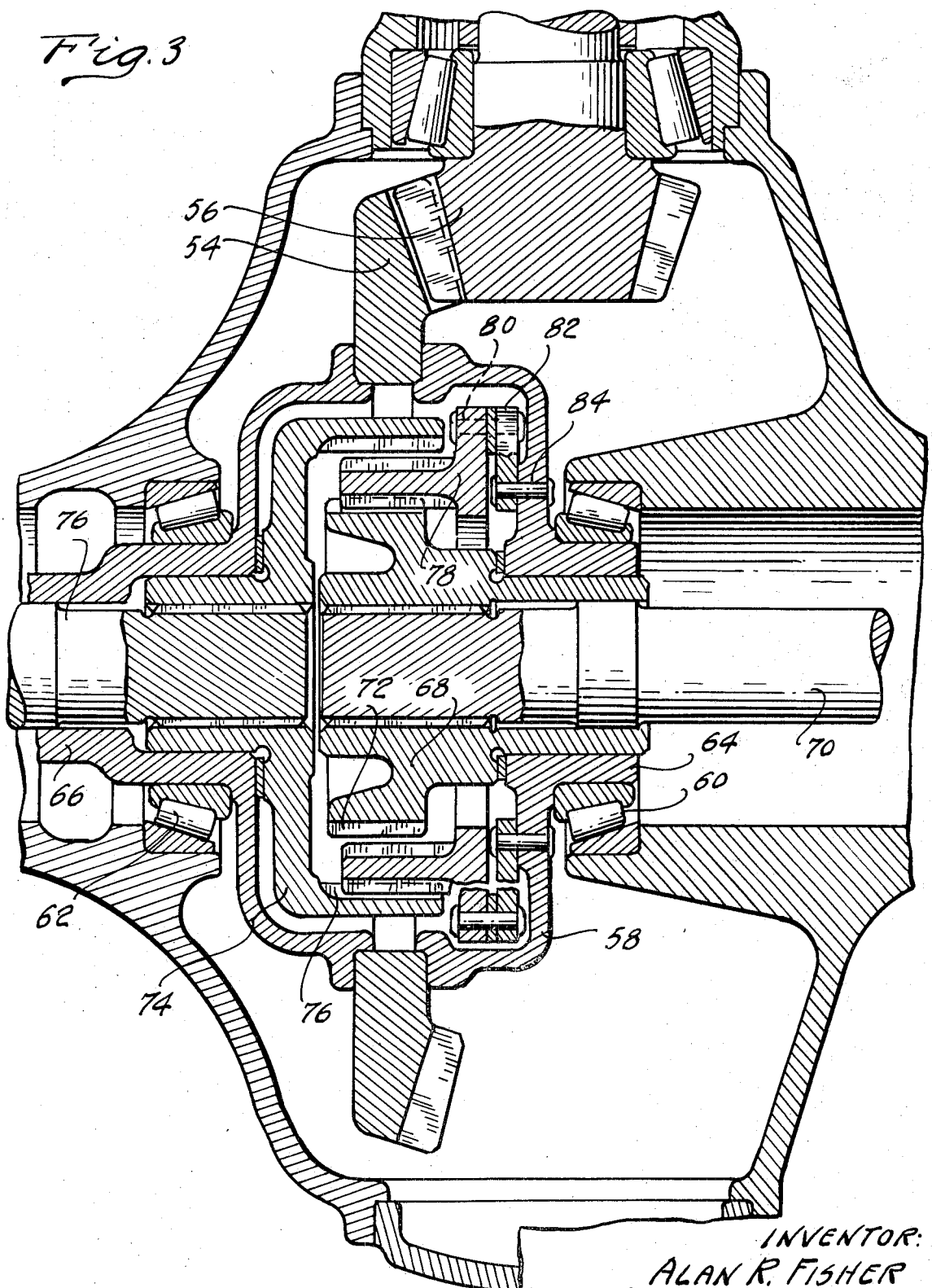

3,548,683
DIFFERENTIAL GEAR MECHANISM WITH
WOBBLING INERTIA RING
Alan R. Fisher, Highland Park, Mich., assignor to Ford
Motor Company, Dearborn, Mich., a corporation of
Delaware
Filed Nov. 29, 1968, Ser. No. 779,908
Int. Cl. F16h 1/44, 1/40, 1/47
U.S. Cl. 74—711          6 Claims

ABSTRACT OF THE DISCLOSURE

A differential gear mechanism adapted to deliver torque to each of two side gears carried by axially aligned power output shafts, including a wobbling ring gear situated between the two side gears in driving engagement therewith to develop an inertia torque bias.

GENERAL DESCRIPTION OF THE INVENTION

The differential gear mechanism of my invention is adapted to be used in a driveline for an automotive vehicle, although it is capable also of being used in other environments. It is capable of distributing torque from an engine driven driveshaft to each of two axle shafts extending to the vehicle traction wheels. The axle shafts are aligned for rotation about a common axis. One end of each axle shaft carries a differential side gear. The side gears are journalled rotatably within a carrier housing, which in turn is journalled rotatably in a relatively stationary differential housing. A driving connection is established between the carrier and the driveshaft.

Gear teeth formed on one side of the ring gear engage one side gear, and the gear teeth on the other side of the ring gear engage the other side gear. Meshing engagement is established between the ring gear and each side gear. The number of teeth in one ring gear side is one less or one greater than the number of teeth in its associated side gear. In a similar fashion, the number of teeth on the other side of the ring gear is either one greater or one less than the number of teeth of the other side gear. When the number of ring gear teeth on one side exceeds by one the number of teeth in its side gear, the number of ring gear teeth on the other side is one less than the number of teeth in its side gear, and vice versa. Upon relative rotation of the differential side gears, a torque bias is established due to the inertia and friction forces established upon displacement of the ring gear.

In conventional differential mechanisms in environments of this type, planetary pinions journalled on the carrier housing mesh drivably with each of two differential side gears. Balanced torques then are distributed to the two axle shafts. Because of the necessity for a torque balance in mechanisms of this type, the amount of tractive effort that can be obtained is dependent upon the lowest coefficient of friction for the traction wheels. If one wheel is operating on a slippery road surface, the amount of tractive effort the vehicle can develop is reduced regardless of the coefficient of friction that may exist between the road surface and the other traction wheel. To overcome this difficulty, it is common practive to introduce a torque bias into the system by clutching one of the side gears to the differential carrier to avoid the freewheeling effect that accompanies an unequal power distribution to the axle shafts. In my invention, however, I have introduced a torque bias by introducing an inertia ring gear mass that is used in lieu of the conventional differential pinions. The ring gear is in the form of a disc having drive lugs or drive teeth situated on its periphery to establish a positive driving connection between the ring gear and the differential carrier housing.

If both axle shafts in my improved construction are rotating at the same velocity, the ring gear will establish a positive driving connection between the carrier housing and the axle shafts through the side gears. If one axle shaft should rotate relative to the other, however, the ring gear will wobble about a central pivot point lying on the axis of the axle shafts. Because of this wobbling action, the teeth of the ring gear will slide into meshing engagement with the teeth of the side gears and then periphery to establish a positive driving connection between the ring gear and the side gears continues. This introduces a friction force as well as an inertia force which creates a torque bias that resists unequal power distribution to the axle shafts.

In a second form of my invention, I employ a ring gear having internal and external teeth of unequal numbers. These engage, respectively, an external side gear connected to one axle shaft and an internal side gear connected to the other axle shaft. In this case the ring gear moves in an eccentric fashion upon rotation of one axle shaft with respect to the other. The axis of the eccentric motion, however, corresponds to the axis of the axle shafts. This eccentric motion introduces the torque bias just as does the wobbling motion of the ring gear in the other enbodiment.

BRIEF DESCRIPTION OF THE FIGURES
OF THE DRAWINGS

FIG. 2 shows a developed view of the gear tooth geometry in schematic form for the side gears and the cooperating teeth of the ring gear for the FIG. 1 construction.

FIG. 3 is a second form of my invention employing an eccentric ring gear with internal and external teeth that engage the two differential side gears.

FIG. 4 shows in schematic form an alternate embodiment of my invention employing cone clutches on the side gears.

Figure 1:
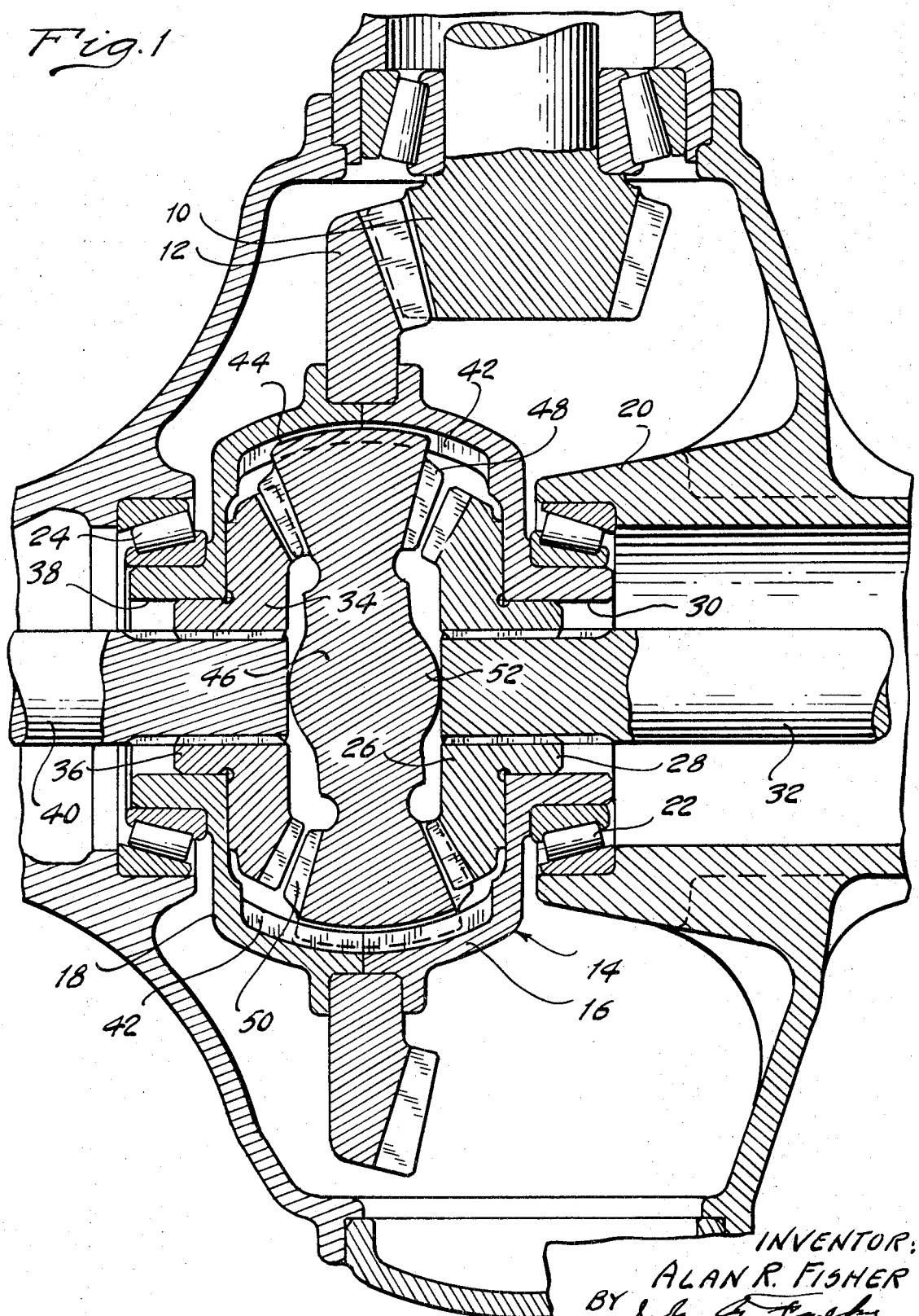
FIG. 1 shows in schematic form a longitudinal cross-sectional view of a first form of my differential gear mechanism.

PARTICULAR DESCRIPTION OF
THE INVENTION

In FIG. 1 numeral 10 shows a power input bevel pinion that may be drivably connected by means of a driveshaft to the crankshaft of an internal combustion engine in an automotive vehicle driveline. Numeral 12 shows a differential bevel ring gear that meshes with the pinion 10. Gear 12 is carried by a differential carrier housing 14 having two housing parts 16 and 18. Ring gear 12 is carried by the periphery of the parts 16 and 18.

A relatively stationary differential housing 20 is formed with bearing openings which accommodate bearings 22 and 24. A first differential side gear 26 is situated within the carrier housing 14 and is formed with a hub 28 that extends through an opening 30 formed in the hub of the carrier 14. A first axle shaft 32 is fixed to the side gear 26. A second side gear 34 also is mounted within the carrier 14. It includes a hub 36 which extends through an opening 38 formed in the opposite end of the carrier 14. A second axle shaft 40 is drivably connected to the side gear 34.

The inner periphery of the carrier 14 is formed with drive lugs or teeth 42 which mesh with peripheral lugs or teeth 44 formed on the periphery of ring gear 46. A first set of differential gear teeth is formed on one side of the ring gear 46 as shown at 48. In the embodiment shown, the number of teeth in the set of teeth 48 is one fewer in number (e.g. thirteen) than the number of teeth in the side gear 26, which has fourteen teeth. A corresponding set of gear teeth is formed on the other side of the ring gear 46 as shown at 50. Teeth 50 are one greater in number than the number of teeth of the side gear 34, as indicated in FIG. 2.

The drive lug 42 and the cooperating teeth 44 accommodate axial sliding motion of the periphery of the ring gear with respect to the carrier 14. This axial displacement of the periphery of the ring gear 46 occurs whenever the ring gear 46 is subjected to a wobbling motion as the side gear 34 rotates at a different speed than the speed of rotation of the side gear 26. The center of the ring gear 46 can be formed with a spherical bearing surface 52 which registers with bearing surfaces on the ends of the axle shafts 32 and 40.

If both axle shafts rotate at the same speed, the ring gear 46 will remain stationary and will establish an effective lock between the carrier housing and the two axle shafts. If, however, the axle shaft 32 should rotate at a different speed than the axle shaft 40, a wobbling motion will occur in the ring gear 46. The teeth of the gear tooth set 48 then will move into mesh and out of mesh with respect to the teeth of the side gear 26. The same is true for the gear teeth of set 50 with respect to the teeth of the side gear 34. This introduces a friction force that establishes a torque bias. In addition, the wobbling motion introduces an inertia force that augments the friction torque bias.

I contemplate further that the differential housing will be filled with lubricant. The wobbling motion of the ring gear 46 thus will establish a pumping action that will further introduce hydrostatic friction forces that will tend to augment the net torque bias as the fluid is displaced from one side of the ring gear to the other.

In FIG. 3 I have shown a differential gear mechanism having a power input ring gear 54 that is driven by a differential bevel pinion 56. A differential carrier housing 58 is journalled by means of differential bearings 60 and 62. Carrier housing 58, which is formed with a first hub 64, is received within the bearing 60 and a corresponding hub 66 is received within the bearing 62. Ring gear 54 is secured to the carrier housing 58.

A first differential side gear 68 is located in the carrier housing 58. It is secured drivably to an axle shaft 70. It is formed with external gear teeth 72. A second differential side gear 74 also is situated within the carrier housing 58. It is drivably connected to a second axle shaft 76 which is aligned with respect to axle shaft 70. Side gear 74 is formed with internal gear teeth 76.

A ring gear 78 is situated between the teeth of gear 68 and the teeth of gear 74. Gear 78 is formed with internal teeth that mesh with the external teeth of gear 68. Gear 78 is formed also with external teeth which mesh with internal teeth of gear 74. The number of external teeth in the gear 78 is formed with a fewer number of teeth than the number of teeth in the gear 74. Similarly, the gear 68 is formed with a fewer number of teeth than the number of internal teeth formed in the gear 78.

Gear 78 is supported by stub shafts 80, which in turn are journalled on a link 82. The radially inward part of link 82 is journalled on the stub shaft 84, which in turn is fixed to the carrier housing 58. Shafts 84 are located radially inwardly of the shafts 80. It is apparent, therefore, that if relative rotation occurs between the gears 74 and 68, the ring gear 78 will rotate with an eccentric motion with respect to the axis of the output axle shafts. This introduces an inertia force as well as a friction force due to the movement of the gear teeth of gear 78 into and out of meshing engagement with the companion teeth of the gears 68 and 74.

Because of the driving connection that is established between the gears 74 and 68, torque is divided between the two axle shafts in a ratio that is determined by the ratio of the pitch radii of gears 74 and 68 if the speed of one axle shaft is equal to the speed of the other. The torque bias is established only when one axle shaft overruns the other.

Because the torque multiplication ratio that is established between gear 54 and gear 68 is different than the corresponding torque multiplication ratio established between the gear 54 and the ring gear 76, torque will be divided unequally between the shafts. Under some circumstances this is desirable where the torque reaction in the vehicle driveline is such that the right rear wheel of the vehicle tends to be lifted by engine torque reaction from the road surface during acceleration of the vehicle. In these circumstances the respective gear ratios established for the two axle shafts can be altered so that a greater torque distribution is made to the left rear traction wheel than to the right rear traction wheel.

In the FIG. 4 embodiment axle shafts 86 and 88 extend to the vehicle traction wheels. Differential carrier housing 90 is journalled in the main housing by means of spaced tapered roller bearings 92 and 94. Differential side gears 96 and 98 are positioned in the housing 90 and are connected respectively to the axle shafts 86 and 88. Ring gear 100 is formed with two sets of ring gear teeth, one set being located on each side of the ring gear. The periphery of the ring gear 100 is provided with external teeth 102 which mesh continuously with internal teeth 104 formed in the housing 90.

Ring gear 100 is adapted to oscillate about its center 106. As this occurs, a sliding motion takes place between the engaged teeth 102 and 104 which introduces a fraction force that creates a torque bias.

The relationship of the teeth of side gear 96 to the meshing ring gear teeth of ring gear 100 and the corresponding relationship of the teeth of side gear 98 to the other set of ring gear teeth is the same as the previously described relationship of the teeth of side gears 26 and 34 to the two sets of teeth for ring gear 46 in the embodiment of FIG. 1.

Side gear 96 and side gear 98 are each formed with external cone clutch surfaces which are adapted to engage internal cone clutch surfaces formed in housing 90. The clutch surfaces are urged into a clutch engagement position in response to the thrust forces that act upon the side gears due to the torque transmitted to the side gears through the ring gear. This produces a friction torque bias that supplements the inertia torque bias produced by the oscillating ring gear.

Having thus described preferred forms of my invention, what I claim and desire to secure by United States Letters Patent is:

1. A differential gear mechanism comprising a pair of axle shafts with a common axis of rotation, a power input shaft, a differential carrier mounted in a housing for rotation about the axis of said axle shafts, a driving connection between said power input shaft and said carrier housing, a pair of differential side gears in said carrier housing, one side gear being connected with one axle shaft and the other side gear being connected to the other axle shaft, a ring gear situated in said carrier housing and having formed thereon two sets of gear teeth, the pitch circle for each set of gear teeth encircling the axis of said axle shafts, one set of gear teeth of said ring gear engaging the gear teeth of one side gear and the other set of gear teeth of said ring gear engaging the other side gear, the number of teeth in one set of ring gear teeth being different than the number of teeth in its companion side gear, and a driving connection between said carrier housing and said ring gear, said sets of ring gear teeth being axially disposed with respect to each other along said common axis of rotation, the effective pitch diameter of said one set of ring gear teeth being substantially the same as the pitch diameter of the other set of ring gear teeth, said ring gear thereby being adapted for angular oscillation about an axis that is transverse to said common axis of rotation upon relative rotation of said side gears.

2. The combination as set forth in claim 1 wherein said differential carrier housing and said ring gear are formed with engageable parts that establish a driving connection between said ring gear and said housing, a ring of first gear teeth formed on one side of said ring gear and a corresponding ring of second gear teeth formed on the other side of said ring gear, each ring of gear teeth being engageable with a separate one of said side gears.

3. The combination as set forth in claim 2 wherein the number of teeth in one ring of gear teeth is two less than the number of teeth in the other ring of gear teeth, the numbers of teeth in the side gears being the same.

4. The combination as set forth in claim 2 wherein the number of gear teeth in one side gear is one less than the number of teeth in the cooperating ring of gear teeth and the number of teeth in the other side gear is one greater than the number of teeth in the ring of cooperating gear teeth.

5. The combination as set forth in claim 1 wherein said housing and each side gear are formed with cooperating friction surfaces whereby relative rotation of said side gears is retarded upon engagement of said surfaces, the gear tooth separating forces for the engaged teeth of said side gears and said ring gear teeth urging said side gears into frictional engagement with said housing thereby causing a friction torque bias upon relative rotation of said side gears which supplements the inertia torque bias due to oscillation of said ring gear.

6. The combination as set forth in claim 5 wherein the friction surfaces formed on said housing and on said side gears are cone surfaces, the cone surface on said side gears engaging cooperating cone surfaces on said housing when the forces on said side gears tend to urge them apart.

References Cited
UNITED STATES PATENTS

| | | | |
|---|---|---|---|
| 449,900 | 4/1891 | Clemons | 74—805 |
| 515,696 | 2/1894 | Sears | 74—800 |
| 1,483,606 | 2/1924 | Krohn | 74—714 |
| 1,897,555 | 2/1933 | Ford | 74—650 |
| 2,369,075 | 2/1945 | Robbins | 74—650 |
| 2,795,155 | 6/1957 | Bade | 74—805 |
| 3,013,447 | 12/1961 | Hils et al. | 74—805 |

MARK NEWMAN, Primary Examiner

T. C. PERRY, Assistant Examiner

U.S. Cl. X.R.

74—713, 714, 800